No. 883,862. PATENTED APR. 7, 1908.
H. H. CUMMINGS.
NAIL FORMING AND DRIVING MACHINE.
APPLICATION FILED JULY 17, 1905.

5 SHEETS—SHEET 1.

Witnesses:
Robert H. Kammler
Geo. H. Emery

Inventor:
Henry H. Cummings
by Emery, Booth, Bowell
his Attorneys

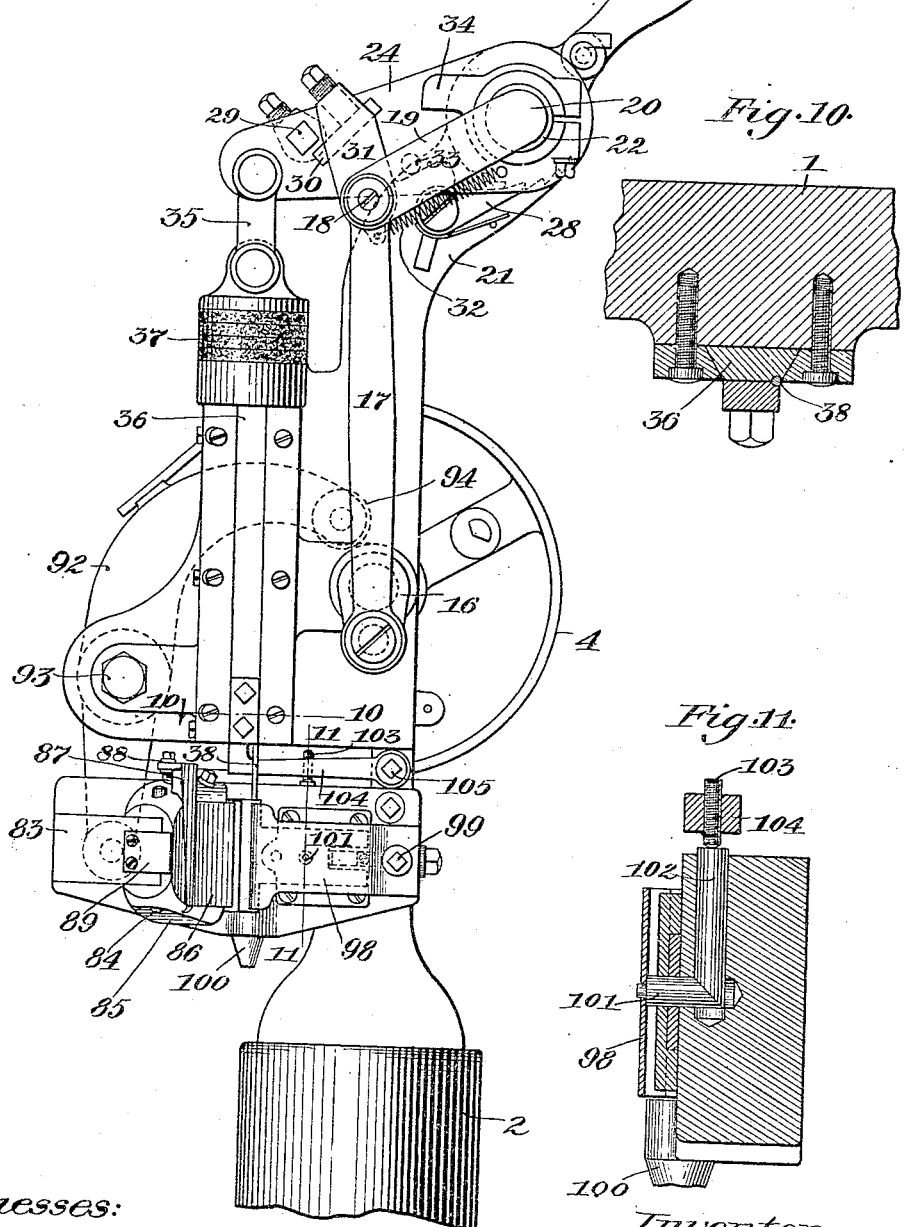

No. 883,862.
PATENTED APR. 7, 1908.
H. H. CUMMINGS.
NAIL FORMING AND DRIVING MACHINE.
APPLICATION FILED JULY 17, 1905.
5 SHEETS—SHEET 3.
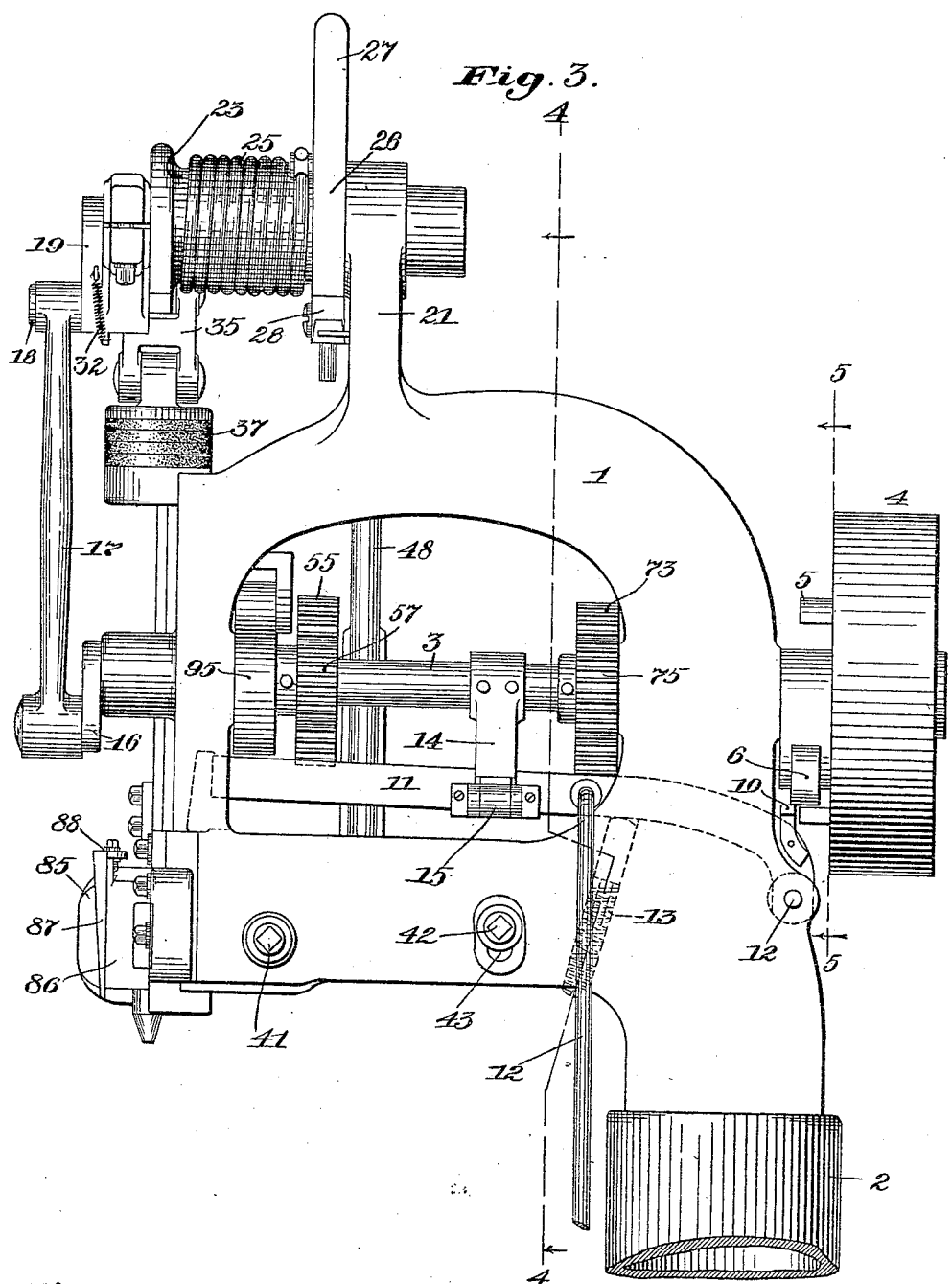
Witnesses:
Horace H. Crossman.
Robert H. Kammler.
Inventor:
Harry H. Cummings
by Emery, Booth, Powell
Attys No. 883,862. PATENTED APR. 7, 1908.
H. H. CUMMINGS.
NAIL FORMING AND DRIVING MACHINE.
APPLICATION FILED JULY 17, 1905.
5 SHEETS—SHEET 4.
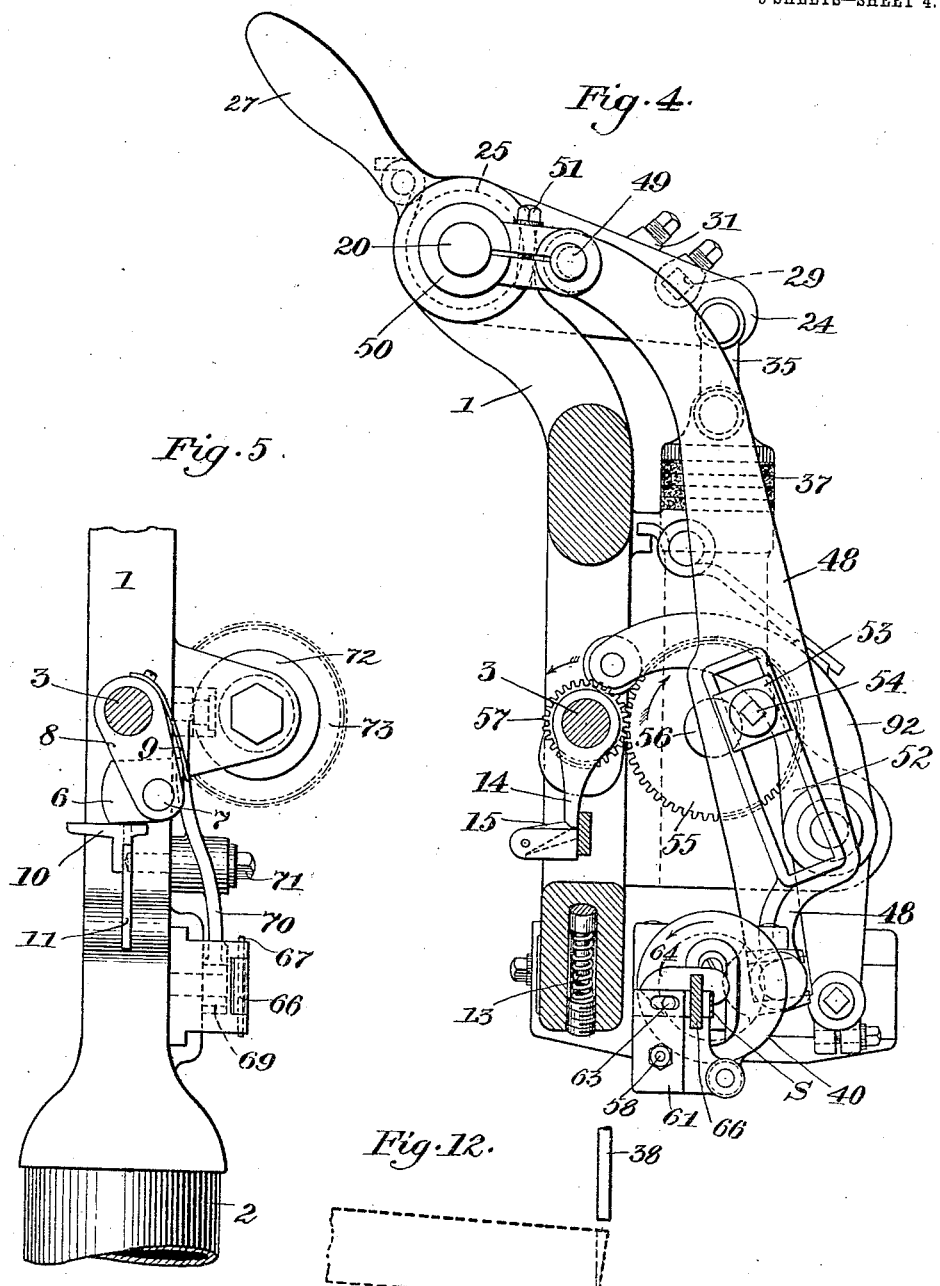

No. 883,862. PATENTED APR. 7, 1908.
H. H. CUMMINGS.
NAIL FORMING AND DRIVING MACHINE.
APPLICATION FILED JULY 17, 1905.

5 SHEETS—SHEET 5.

UNITED STATES PATENT OFFICE.

HENRY H. CUMMINGS, OF NEWTON, MASSACHUSETTS, ASSIGNOR, BY MESNE ASSIGNMENTS, TO THOMAS G. PLANT, OF BOSTON, MASSACHUSETTS.

NAIL FORMING AND DRIVING MACHINE.

No. 883,862.      Specification of Letters Patent.      Patented April 7, 1908.

Application filed July 17, 1905. Serial No. 269,985.

*To all whom it may concern:*

Be it known that I, HENRY H. CUMMINGS, a citizen of the United States, residing at Newton, in the county of Middlesex and Commonwealth of Massachusetts, have invented an Improvement in Nail Forming and Driving Machines, of which the following description, in connection with the accompanying drawings, is a specification, like letters on the drawings representing like parts.

This invention in nailing machines relates particularly to machines that cut and drive nails, usually tapered, from the end of a continuous ribbon or flat strip of metal drawn from a coil.

When the nails are made tapering, as above suggested, more of the strip is removed from the edge thereof as when the head is formed than from the opposite edge to form the points, consequently the strip is reversed after the formation of each nail, so that the heads and points of successive nails will be formed alternately from one and the same edge of the strip, thereby avoiding any waste of material.

A machine for forming and driving nails or fastenings in this manner is illustrated in U. S. Patent to Louis Goddu, No. 360,585, dated April 5, 1887.

My invention aims to simplify and improve machines of this type, and the invention will be best understood from a description of one embodiment thereof which has been selected for present illustration of the invention.

Figure 1:
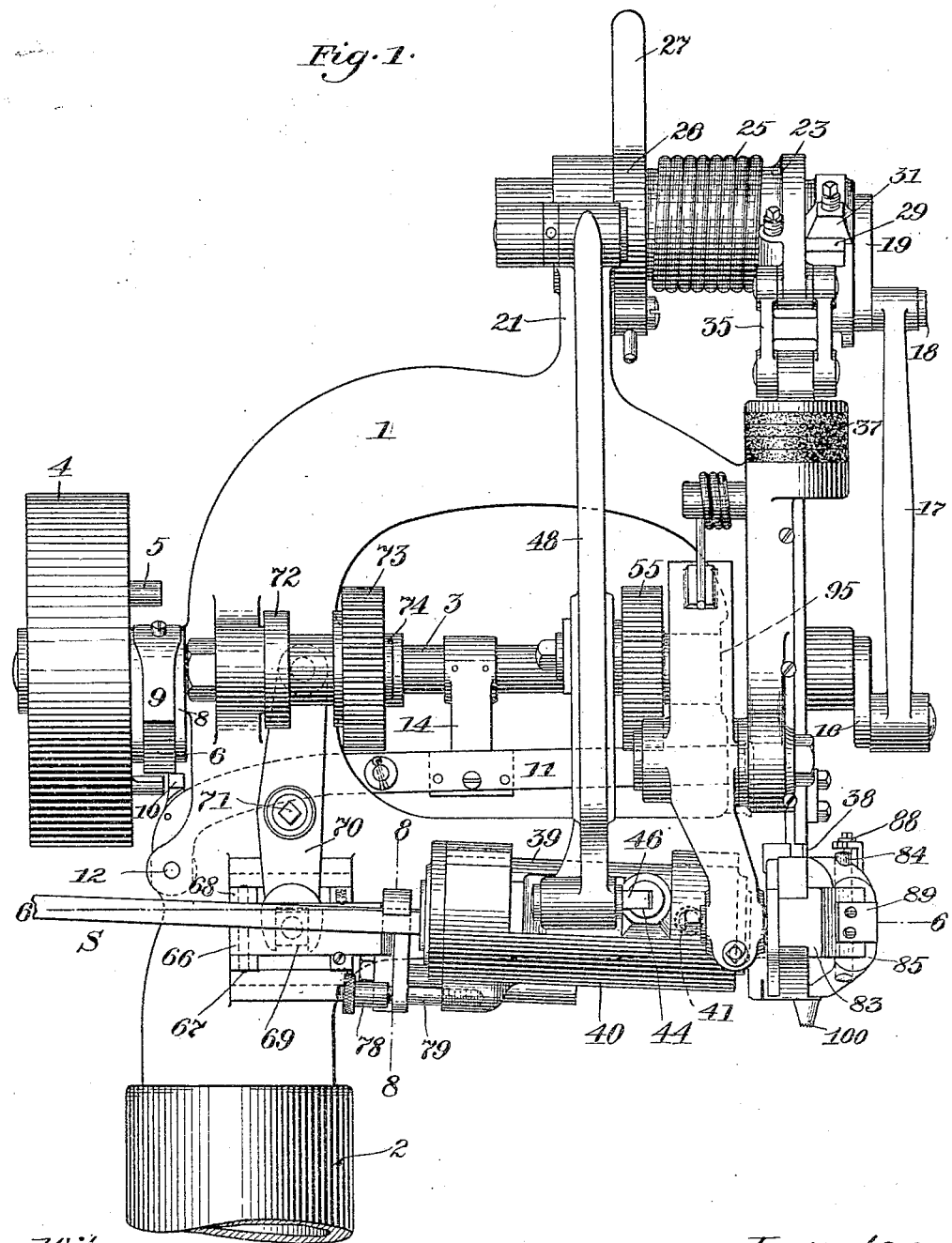
Figure 6:
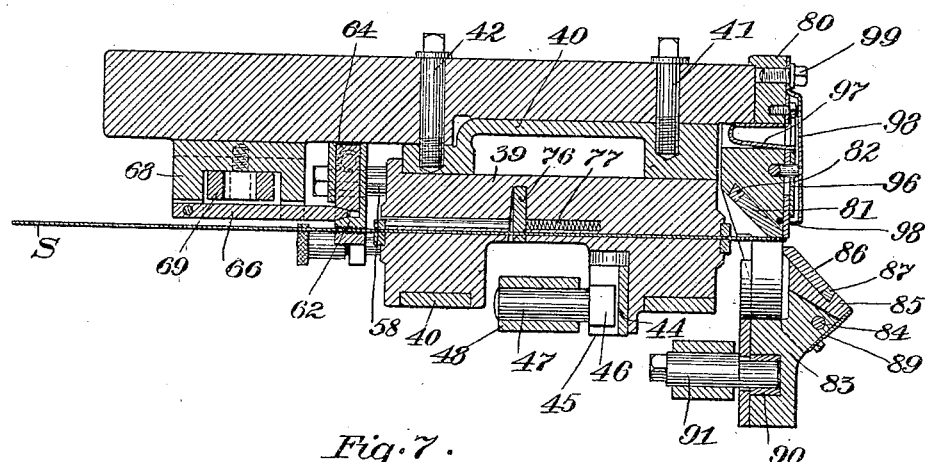
Figure 7:
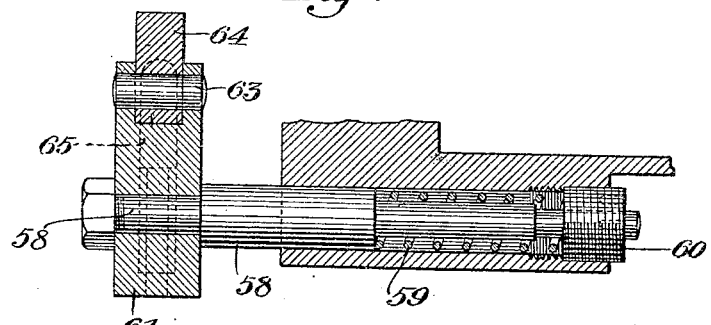
Figure 8:
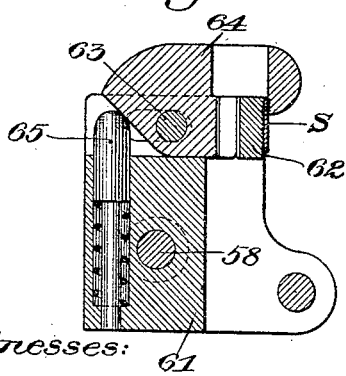
Figure 9:
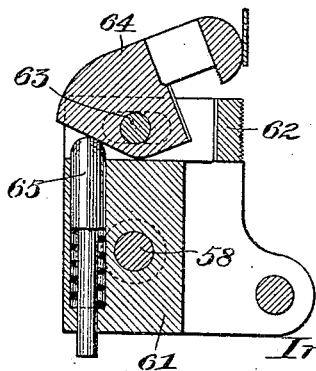

In the accompanying drawings illustrating the selected embodiment of my invention above referred to, Figure 1, in left-hand side elevation, shows my improved machine; Fig. 2, a front elevation of said machine; Fig. 3, a right-hand side elevation thereof; Fig. 4, a vertical cross section on the dotted line 4—4, Fig. 3, looking toward the left or front of the machine. Fig. 5 is a vertical sectional detail in front of the pulley, Fig. 3, on the dotted line 5—5, looking also toward the left or front of the machine; Fig. 6 is a horizontal section on the dotted line 6—6, Fig. 1, looking downward; Fig. 7 is an enlarged sectional detail of a part of Fig. 6, to be referred to; Figs. 8 and 9, sectional details on the dotted line 8—8, Fig. 1, looking to the right or toward the front of the machine; Fig. 10 is a cross sectional detail on the dotted line 10—10, Fig. 2, looking down; Fig. 11, a cross sectional detail on the vertical dotted line 11—11, Fig. 2, looking to the left; and Fig. 12, a diagrammatic view illustrating the manipulation of the strip from which the nails or fastenings are cut.

Referring to the drawings, the frame 1, of suitable shape to sustain the working parts, is carried upon a stem 2, adapted to be received and held in and by a usual clamp-socketed end of a supporting column, not shown, and in which it may be vertically adjusted to accommodate the machine to the particular operator thereon.

Journaled in the frame, is the horizontal main or drive shaft 3, having its rear end projected beyond the frame to receive loosely thereon the driving pulley 4. This driving pulley is provided at its front side, Figs. 1 and 3, with a series of studs 5, adapted for engagement with the end of a clutch dog 6, Fig. 5, pivoted at 7 in the end of an arm 8, fixed on the shaft 3, between the driving pulley and the frame.

The clutch dog itself is acted upon at its inner end, Fig. 5, by a spring 9, that presses the free end of said dog normally downward to and upon a table 10. This table, see Figs. 1 and 3, is fast on a starting lever 11, fulcrumed at 12 in the frame, and extended forward through the frame, across the intermediate opening therein, with its front or free end guided vertically in a suitable slot formed therefor in the front or head end of the frame. Between its ends, there is connected to said starting lever, a depending rod 12, leading to a foot treadle of desired construction and position, depression of which, by dropping the starting lever, causes the dog supporting table 10 to swing to the left, Fig. 3, or right, Fig. 1, from beneath the said dog, permitting the latter, acted upon by its said spring 9, to be thrown radially out from the main shaft 3, from which it is hung, and into the path of rotation of the studs 5 on the driving pulley 4. When so swung out from its shaft, the first stud 5, to meet it, engages the end of the dog and carries the dog and its connected drive shaft 3 with it through one complete rotation. If the foot treadle is maintained depressed and the dog supporting table 10 removed from beneath the normal position of the said dog, the dog will maintain its engagement with this driving pulley and the shaft will continue in rotation through a plurality of turns.

If, however, the treadle upon depression is immediately released or, when after having rotated the shaft 3 a plurality of times the said treadle is finally released, said lever 11 will rise under the action of its spring 13, Fig. 3, and will swing its dog-supporting table 10 to the right, into the path of rotation of said dog, to throw the dog out of engagement with the driving lug 5 of the pulley and permit the shaft 3 to be stopped. To insure the stopping of said shaft always in a predetermined position, it is provided, see Figs. 1 and 3, within the open space referred to, with a stop arm 14 which, when the starting lever is raised to its normal, dog disengaging position, brings up against the side of said starting lever and enforces the stopping of the said shaft in one invariable position determined by the adjustment of said arm 14 on the shaft. The starting arm, it will be noticed, is broad vertically and thin so that when the stop arm 14 brings up against it, it will yield or spring just enough to remove any possible damaging shock due the stopping of the machine.

The starting lever 11, see Figs. 3 and 4, is further provided with a spring controlled latch 15, that yields to permit the stop arm 14 to bring up against said starting lever when it immediately springs into position behind said stop arm to prevent rebound of the latter from the starting lever. When the starting lever is depressed to free the dog itself, said lever and its latch 15 are drawn down away from and to free the stop arm 14 so as not to interfere with the rotation of the shaft 3 of said dog.

Fast upon the front end of the shaft 3, Fig. 1, is a crank 16, to which is jointed the connecting rod 17, vertically extended and jointed at its upper end at 18, Fig. 2, to the free end of an arm 19, on the end of the spring shaft 20, carried in a supporting bracket 21, on the frame.

The spring shaft 20 does not have its bearings directly in the said bracket 21, Fig. 2, but in a tubular bearing 22, extended forward from said bracket, and loosely mounted on said tubular bearing is the hub 23, Fig. 3, of the driver arm 24, see Fig. 2. This driver arm is engaged by the front end of the driver spring 25, the opposite end of said spring being attached to a ratchet plate 26, Figs. 1 and 3, provided with a handle 27, by which it may be adjusted, and held in adjusted position, Fig. 2, by a spring controlled pawl 28 at its under side.

The driver arm 24, Fig. 2, has extended through it the loosely squared, or other suitably shaped lifting bar 29, adapted to be engaged by the lifting plate 30, also preferably rectangular in cross section. This lifting plate is adjustably held in one arm of the bell crank lever 31, loosely mounted upon the pivot 18, that joins the connecting rod 17 to the spring arm 19. This bell crank lever is acted upon by a spring 32, Fig. 2, that throws its upper end normally to one side with the end of the lifting plate 30 under and in position to engage the lifting bar 29, its said movement being limited by a stop 33, shown in the dotted lines, Fig. 2.

When the shaft 3 is rotated by the clutch wheel, this crank 16, through the connecting rod 17, Fig. 2, lifts the spring arm 19, and thereby lifts the bell crank lever 31 and causes its lifting plate 30 to engage the lifting bar 29, and lift the driver arm 24, the stop 33, holding the said bell crank lever in lifting position against the tension of the driver spring 25, which of course is put under tension by the lifting of the driver arm 24.

At a given point in the lifting movement of the said driver arm, the end of the horizontal arm of said bell crank lever 31, meets the stationary but adjustable stop 34, clamped upon the projecting end of the tubular bearing 22, and is turned back by said stop to throw the end of the lifting plate 30 out from beneath the lifting bar 29, to release the latter and permit the driver spring 25 to depress the driver arm 24, with a movement sufficient to drive the nail to be described.

The driver arm 24 of course reaches its lowest position before the crank controlled bell crank lever reaches its lowest position and, as the lifting plate 30 in its downward movement meets the lifting bar 29, it is thrown back against the tension of its own spring 32, to clear said lifting bar 29 and again spring under the said bar, Fig. 2, in readiness for a second lifting action. To the free end of the driver arm 24 is jointed the H-shaped link 35, connecting the said driver arm with the upper end of the driver bar 36, mounted to slide in vertical bearings in the frame head. The upper end of this driver carrier is formed to present a broad head, between which and the top of the frame head, are interposed preferably a plurality of cushioning washers 37, to cushion the sharp, spring actuated driving movements of the driver.

At its lower end the driver bar 36, has adjustably clamped therein the driver proper 38, Figs. 2 and 10. Each rotation of the main shaft 3 operates through the mechanism described, first to lift and then to impart to this driver 38 a sharp spring actuated driving movement.

The metal strip from which the fastenings or nails are to be cut and driven, is marked S, Fig. 1, and may be taken from any suitable coil carried in any suitable manner, either to rotate with the strip, as in said Goddu patent referred to, or held in a stationary reel relying upon the flexibility of the strip to permit the front end thereof to be twisted back and forth without correspondingly turning the coil or reel. This strip, see Fig. 6, is led toward the front of the machine through a sleeve 39, slightly pitched from the true horizontal, and mounted for oscillation in suitable bearings forming part of a yoke 40, adjustably secured upon the side of the machine frame. At its front end this sleeve carrying yoke 40 is fulcrumed upon a screw 41, Fig. 6, and dotted lines Fig. 1, in the machine frame and, at its back end it is supported adjustably by a clamping screw 42 which, see Fig. 3, is passed through an arc-shaped slot 43 in the machine frame. By slackening this clamping screw 42, the pitch of the yoke 40 and the strip sleeve 39 journaled therein, may be varied at will thereby to vary the pitch or angle at which the contained metal strip shall emerge from and at the front of the machine.

The strip sleeve 39 is oscillated to present first one and then the opposite edge of the strip uppermost to the driver by means best shown in Figs. 1, 4 and 6. Between its bearings the strip carrying sleeve is provided with a radial guide way that receives the radially slidable block 44. This block at one side, Fig. 6, is slotted at 45 to receive the flat head 46 of a pin 47, carried in the lower end of the sleeve actuator 48. This sleeve actuator, see Fig. 4, at its upper end is jointed to a pin 49 in the end of a split arm 50, fast on the rear end of the spring shaft 20, previously described. The pivot pin 49 is made eccentric at its end to which the actuator 48 is connected, and is made rotatable in the split arm 50 for purposes of adjustment, a single clamping screw 51, Fig. 4, serving to hold both the arm itself and said pin in adjusted position. Obviously, oscillation of the spring shaft 20 by the means, Fig. 2, described for lifting and releasing the driver, will cause the sleeve actuator 48 also to be reciprocated through a distance determined by the length of the split arm 50 described.

To cause the reciprocation of the actuator 48 to oscillate the strip sleeve first in one and then in the opposite direction to reverse the strip, I have provided the said actuator near its lower end with the slightly oblique slot 52. This slot receives a block 53, mounted upon a crank pin 54 on a crank wheel 55, loosely mounted upon a stud 56, carried by the machine frame. The crank wheel 55 is toothed at its periphery and, see Fig. 4, is driven by a pinion 57, fast on the main shaft 3 of the machine. The ratio of diameters of said gear 55 and pinion 57 is as 2 to 1, so that every complete rotation of the main shaft 3, in the direction of the arrow Fig. 4, will cause a half rotation of the crank wheel 55, so as to carry the slide block 53 from one to the other side of the axis of said wheel. Consequently whenever the said actuator 48 is lifted as described, its slide block 53 will be moved first to the left, Fig. 4, to cause the lower end of the said actuator to carry the sleeve in the direction of the arrow, Fig. 4, through $\frac{1}{2}$ a complete rotation and when next lifted the second half rotation of said crank wheel by carrying the slide block and the lower end of said actuator back again to the right, Fig. 4, will oscillate the said sleeve back again to its normal position. Thus for one driving movement the sleeve is turned to present one strip edge uppermost, while for the next succeeding driver movement, the said sleeve is turned back to present the opposite strip edge uppermost and this, it will be noticed, is accomplished, without the use of any segmental gears or rack and pinion mechanisms; the slide block 53 which swings the lowest end of the actuator, moves always in one direction and is in no sense reciprocatory.

Referring to Fig. 1, it will be seen that the strip carrier 39 pitches downward and forward so that the end of the strip when fed out through and at the front of said carrier, is presented obliquely. In my machine however, the strip is not oscillated about the axis along the middle of the strip requiring both edges of the strip to be oscillated and in opposite directions but, is oscillated about an axis at or beyond one edge of the strip. This will be more clearly understood by reference to Fig. 12, where the strip is shown in full lines in its lowest position, which is the position shown in full lines, Figs. 1 and 4. The driver is shown positioned above the projecting end of the strip which, it will be seen, presents a longer projection along its axial or upper edge, than at the lower edge thereof, consequently, assuming the projecting end of the strip to be severed along a truly vertical line, indicated by the dotted lines, it will be clear that a wedge shaped or tapered nail will be produced, which stands in position to be driven by and upon descent of the driver. Assuming this nail to have been so driven, if the strip be now oscillated from its lowest to its highest position by oscillation of its carrier 39, what was in full lines the lower edge of the strip now becomes the higher edge thereof and, by reason of the pitch or obliquity of the carrier, when this strip is thus oscillated upward about its edge as an axis, its front end swings through a transverse plane that is pitched forward or obliquely to a perpendicular so that in thus swinging it upward, said lower edge is advanced relative to the true perpendicular and, when it reaches its uppermost position, presents to a vertical cutting line and the vertically descending driver a second wedge-shaped portion, to be severed for the next nail without requiring the strip to be fed as when in the lower strip position and as in machinery as heretofore constructed. This second nail being now severed and driven from the strip when the latter is in its uppermost position, the sleeve 39 is oscillated to drop the strip to carry the same as before, down into its original lowermost position in full lines, Fig. 12, but this time the strip must be fed forward a distance that is sufficient to give to the now upper edge of the strip, the required projection for the width of the head end of the next nail to be formed. Thus, while in machines of the Goddu type, that oscillate the strip about a mid-axis between the edges of the strip, it is necessary to feed the strip forward and in its carrier for the formation of every nail, with my invention as herein embodied, it is necessary to feed the strip in and relative to its carrier for every alternate nail only, and the effect of this feed is a double one as it suffices for the next two nails to be formed. In the said Goddu type of machine, the strip is fed forward by moving its carrier or carrier sleeve forward, after which the strip is seized and held while the carrier returns to its normal position. In this my present machine however the feed is quite independent of the carrier, leaving the latter unobstructed and uncomplicated by any feeding devices.

The feeding mechanism that I employ is best shown in Figs. 1 and 6 to 9 inclusive.

Referring to Fig. 1, the sleeve yoke 40 has formed at its under side a bearing for the slide rod 58, the same having a reduced shank, Fig. 7, encircled by a spring 59, seated at one end upon the shank shoulder and at its opposite end upon an adjusting plug 60, tapped into the end of a slide rod bearing. This spring keeps the slide rod 58 normally in its outermost position at the left in the drawings and, upon the outer end of this slide rod is made fast the feed carrier block which is provided at its upper right-hand corner, Figs. 8 and 9, with a feed block 62, preferably having a serrated or roughened front face. This feed carrier is slotted horizontally near its upper end to receive a slidable pivot pin 63, upon which is pivoted the movable feed jaw 64, having an overturned end adapted to overhang the front face of the fixed feed block 62, and with the inner face of said overhang similarly serrated or roughened to coöperate with the opposed roughened face of said feed block to engage the strip from opposite sides the latter and feed it forward as will now be described.

The inner end of the movable feed jaw is beveled as shown in Figs. 8 and 9, to be acted upon by a spring actuated pin 65, which tends to keep the said jaw normally, though with light pressure, in its position, Fig. 8, with its overhanging end in front of the feed block 62. The inner or left hand face of the block 62, Fig. 8, and the opposed outer or front right hand face of the movable jaw 64 are oppositely beveled as shown in Fig. 6, leaving a wedge shaped space into which is adapted to enter the wedge shaped end of a lock feed slide 66. This lock slide 66, see Fig. 1, is vertically pivoted at 67 to a horizontal slide head 68, see Fig. 6. This slide head is slotted at its front face and is provided thereat with a pivoted block 69, engaged by the forked lower end of the feed lever 70, fulcrumed upon the frame at 71, and operated at its upper end by a cam 72. This cam is fast to or formed as the hub of a toothed carrier wheel 73, Fig. 1, loosely mounted upon a stud 74 on the frame and driven by a toothed pinion 75, Fig. 3, on the main shaft 3 of the machine. The ratio of the gear 73 and its pinion 75 is also as 2 to 1, so that the said gear 73 and its cam 72 are rotated once for every two rotations of the said main shaft; and the cam 72 is so timed that before the beginning of every alternate rotation of the main shaft 3 and when the strip S is in its lowermost position, it carries the slide head 68 to the right, Figs. 1 and 6, to cause the tapered end of the lock slide 66 to enter the space between the inner face of the feed block 62, Fig. 8, and the opposed surface of the feed jaw 64, to cause the overhanging end of the feed jaw to be drawn towards and firmly to grip the strip S between itself and the roughened face of the feed block 62. Further forward movement of the said feed slide 68, with the strip thus described clamped under the movable jaw 64, acts to carry the entire jaw and its opposed block 62 with the strip clamped between them, bodily forward, the slide rod 58, Fig. 7, upon which they are mounted, sliding along in its bearing in the frame and against the tension of its spring 59 until the strip has been fed in its carrier for the required distance. This takes place very quickly and the strip is caught and held in its new position in the carrier, see Fig. 6, by a back stop lock 76, controlled by a spring 77, all mounted in the said carrier. The aperture in this back stop lock 76 fits the strip very closely and permits the strip to pass freely through it only when it is moved slowly forward from its position, Fig. 6. Any tendency of the strip to return in a direction opposite to the feed would permit said stop to swing under the action of its spring and lock itself and the strip against further movement in that direction, its practical effect being to prevent any retrograde movement whatever of the strip. After the strip has been so fed forward and held, the slide head 68 is returned to its original position to the left, Fig. 1, the return movement of the feed jaws being limited, see Fig. 1, by an adjustable thumb nut 78 threaded upon the end of a stud 79, mounted in the sleeve bearing 40. When the jaws bring up against this back stop, further return movement of the slide head 68 withdraws the lock slide 66 from between the two jaws and leaves the movable jaw perfectly free.

When the nail has been cut and driven from the end of the strip in the lowest position of the latter and, prior to the driving of the next fastening, said strip is oscillated into its elevated position, Fig. 9, it automatically lifts the movable feed jaw 64 upward and backward as shown in Fig. 9, and there holds it during the forming and driving of the second nail until said strip is again oscillated or rolled down into its lowest position, when the said movable jaw automatically follows it and again assumes its overhanging position Fig. 8, in readiness for a new feed.

Of course the extent of feed at each reciprocation of the slide head 68, depends upon the adjustment of the back stop nut 78, which limits the return movement of the feed jaws, said slide head moving the jaws always to one and the same forward position but through a greater or less distance, according to the return movement of said jaws permitted by said back stop. Thus it will appear that the nail strip is fed only upon alternate fastener forming and driving movements and is in no sense dependent upon the movements of the strip carrier 39.

Having now described the means for oscillating the strip and the means for feeding the strip upon alternate oscillations, I will describe the cutting mechanism for cutting or severing the nails from the end of the strip, preparatory to the driving of the same into the work. This cutting mechanism is best shown in Figs. 2 and 6.

Upon the head end of the machine frame is fixed a horizontal stationary cutter carrier 80, Fig. 6, in which is mounted the obliquely arranged stationary and vertical cutter 81, clamped in suitable manner and held in adjusted position by a back wedge 82, which when adjusted, will advance said cutter without disturbing the vertical alinement of its forward or cutting edge. The stationary cutter carrier 80 is slotted horizontally to present at the left of the driver, Figs. 2 and 6, a horizontal guideway for the movable cutter carrier 83, which slides therein. This movable cutter carrier carries a vertical pivot 84, upon which is hung the cutter block 85, carrying the movable cutter 86, likewise adjustable by a back wedge 87, and held in clamped position in any suitable means. This wedge 87 may be positively adjusted in either direction by means shown at 88, Figs. 1 and 2.

The movable cutter block 85 is held by a spring 89, Fig. 6, in its innermost position with its movable cutter 86 in the line of the leading or cutting edge of the stationary cutter 81, so that as said movable cutter is moved toward the stationary cutter, see Fig. 6, it will engage the projecting end of the strip S which stands between the two, and will sever the said projecting end by a clean shearing action. The hinging of the movable cutter permits it upon its return movement to drag freely over and clear of the end of the strip.

To reciprocate the movable cutter carrier I have provided the same upon its rear side with a vertical slide way for a roller stud 90, Fig. 6, carried upon an eccentric adjusting pin 91, in the lower end of the feed lever 92, Fig. 2, fulcrumed in the frame head at 93, and carrying at its upper end a roller stud 94 that overlies and is acted upon by a cutter cam 95, see Fig. 3, on the main shaft 3 of the machine. Thus the cutter mechanism is actuated at every rotation by said main shaft, while the feed mechanism is actuated at every alternate rotation only, the oscillation of the strip carrier serving as the intervening feed.

The line of feed of the strip, Fig. 6, is at one side of the line of action of the driver 38, so that the severed nail must be transferred to the right, Fig. 2, into position to be acted upon by the driver. As here shown also, it must not only be transferred across the front of the machine, but must also be pushed inward into the driver passage. To accomplish this I constitute the leading edge of the movable cutter 86, a transferrer, so that after it engages the strip and severs the projecting end therefrom, it will by its further movement carry said severed end, now a nail, bodily across into position opposite the driver passage. To hold the severed nail in place against the end of the movable cutter during this transferring movement, I have provided a presser 96, Fig. 6, mounted to slide across the face of the stationary cutter carrier and acted upon by a spring 97, which presses it always lightly towards the strip and from the opposite side thereof to the movable cutter 86.

When the cutter severs the end of the strip to form a nail, it at the same time grips the same firmly between itself and the said presser 96, and as it continues its movement to transfer the severed nail, the presser yields before it but always maintains its hold upon the nail until the latter has been brought to position opposite the driver passage. Normally resting against the face of this presser 96, is the inturned end of the pusher 98, which is shown as in effect a resilient or spring plate fastened at its outer end 99, upon the said stationary cutter carrier. When the movable cutter 86 has transferred the fastening along into position opposite the driver passage, the end of the presser 96, passes from under the inturned end of the pusher 98, permitting the latter to push said fastening from between the movable cutter and this presser backward into the driver passage where it is caught by the driver upon descent of the latter and driven into the work through the nose piece 100, Fig. 2, against which the work may be held by the operator.

To restore the pusher to permit return movement of the presser, I have provided said pusher, see Fig. 11, with an inwardly extended stud 101, having a beveled inner end adapted to be acted upon by a correspondingly beveled lower end of a vertical slide pin 102. This pin at its upper end underlies an adjusting screw 103, upon a lever 104, which, see Fig. 2, is fulcrumed at 105, upon the frame head and has its free end extended into position under and where it will be struck by the driver bar upon descent of the latter in driving a nail. When the driver descends and drives a nail into the work, the lower end of the driver bar meets and depresses the lever 104, and causes the vertical sliding pin 102, to be pushed downward and by its beveled end to push outward the stud 101 and the spring pusher 98, permitting the presser to spring forward between the pusher and the cutter carrier to prevent the pusher again entering the driver passage and leaving the said presser free to follow the return of the movable cutter until it meets the projecting end of the strip, over which the movable cutter alone is free to pass. The severed nail is thus always under control from the moment it is severed from its strip until it is landed in the driver passage ready to be driven into the work.

The cutters 81 and 86 are flat rectangular bars of steel that may be easily sharpened by grinding and conveniently adjusted following each grinding.

My invention obviously is susceptible of other embodiments than that herein illustrated.

Claim

1. A machine of the class described having, in combination, fastener inserting mechanism and positioning means to reverse a fastener strip about an axis spaced from the middle of the fastener strip.

2. A machine of the class described having, in combination, fastener inserting mechanism; strip positioning means to reverse the end of a strip about an axis spaced from the center of the strip at said end; and mechanism for separating a fastener from the strip and presenting it to the inserting mechanism.

3. A machine of the class described comprising, in combination, cutting and driving means, and means to support a nail strip and to reverse said strip about an axis at one edge of said strip.

4. The combination with strip severing means, of strip carrying means and means to reverse said strip about an axis at one edge thereof.

5. A machine of the class described having, in combination, fastener inserting means; positioning means to reverse a fastener strip about an axis proximate one edge thereof; and mechanism for presenting the fastener to the inserting mechanism.

6. A machine of the class described having, in combination, inserting means; strip positioning means to reverse a strip about an axis proximate the edge of the strip; mechanism to remove a fastener from the strip and to present it to the inserting means; and provision for feeding the strip.

7. A machine of the class described having, in combination, fastener inserting means; strip carrying means; mechanism to remove fasteners in succession from the strip and present them to the inserting means; and feeding means to feed the strip for a part only of said succession of fasteners.

8. A machine of the class described having, in combination, fastener inserting means; strip carrying means; mechanism to remove fasteners in succession from the strip and present them to the inserting means; and feeding means to feed the strip for alternate fasteners only of said succession.

9. A machine of the class described having, in combination, fastener inserting mechanism; strip feeding means to feed a strip for alternate fasteners; positioning means to reverse the end of the strip about an axis spaced from the center of the strip at said end, and to present the strip for the intermediate fasteners; and mechanism for removing a fastener from the strip and presenting it to the inserting mechanism.

10. A machine of the class described having, in combination, cutting and driving means; strip carrying means; means to feed a strip for alternate fasteners; and strip reversing means to reverse the end of the strip about an axis spaced from the center of the strip at said end, to present the strip for intermediate fasteners.

11. A machine of the class described having, in combination, fastener inserting mechanism; fastener feeding means and fastener strip reversing means acting alternatively to present fasteners; and means to introduce a fastener, so presented, to the inserting mechanism.

12. A machine of the class described comprising, in combination, cutting and driving means, an oscillatory strip carrier provided with strip carrying means at one side its axis of oscillation, and feeding means arranged to feed the strip in one oscillatory position only of said strip carrier.

13. A machine of the class described comprising, in combination, cutting and driving means, an oscillatory strip carrier provided with strip carrying means at one side its axis of oscillation, and feeding means arranged to engage the strip effectively, for feeding the latter, in one oscillatory position only of said strip carrier.

14. A machine of the class described comprising, in combination, cutting and driving means, an oscillatory strip carrier, and feeding means comprising two members, against one of which said strip is moved in the oscillation of said strip carrier, the other of which is alternately moved from and into effective position by oscillation of said strip carrier.

15. A machine of the class described comprising, in combination, cutting and driving means, oscillatory strip carrying means, means independent of said strip carrying means to feed the strip for alternate fasteners, and means to restrain retrograde movement of said strip.

16. A machine of the class described comprising, in combination, cutting and driving means, oscillatory strip carrying means, means independent of said strip carrying means to feed the strip for alternate fasteners, and means on said strip carrier to restrain retrograde movement of said strip.

17. A machine of the class described having, in combination, an oscillatory strip carrier; carrier actuating means having a compound endwise and lateral movement; and mechanism so to move said carrier actuating means.

18. A machine of the class described having, in combination, an oscillable strip carrier; an oscillating shaft; a connection between the same moving in synchrony with the shaft; and means coöperating with said connection to cause two oscillations of the shaft to effect one oscillation of the carrier.

19. A machine of the class described comprising in combination, an oscillatory strip carrier, an oscillatory shaft, an actuator connecting the two, and means engaging said actuator between its ends to swing it from side to side, whereby to produce one oscillation of said carrier for every two oscillations of said shaft.

20. A machine of the class described having, in combination, an oscillable strip carrier; an oscillating shaft to actuate the strip carrier; mechanism intermediate the shaft and carrier to cause two oscillations of the shaft to effect one oscillation of the carrier; and means to adjust the inclination of the end of the strip while maintaining operative relations between the carrier and said mechanism.

21. A machine of the class described having, in combination, fastener inserting means; an oscillatory shaft arranged to cause one inserting operation of said means by two oscillations of the shaft; an oscillable strip carrier; and mechanism intermediate the shaft and carrier whereby the former causes one oscillation of the carrier for each inserting operation.

22. A machine of the class described having, in combination, fastener supplying means; fastener inserting means; and mechanism to remove a fastener from the supplying means and to transfer it to the inserting means laterally in first one direction and then in another direction at an angle to the first direction.

23. A machine of the class described comprising, in combination, strip carrying and reversing means, driving means, a cutter, means to move the latter against the side of said strip in the cutting of the latter and to continue said cutter movement thereby to constitute it a pusher to transfer the severed strip portion laterally before driving, and a pusher independent of said cutter to transfer said severed strip portion in a direction at an angle to its direction of transfer by said cutter.

24. A machine of the class described comprising, in combination, strip carrying and reversing means, driving means, cutting means including a movable cutter, means to move the latter to sever the strip and to continue its movement as a pusher to transfer the severed strip portion laterally, a second pusher to transfer said severed portion in a different direction laterally into position for engagement by said driving means, and means operated by said driving means to return said second pusher.

25. A machine of the class described comprising, in combination, strip carrying and reversing means, a driver, opposed cutters, means to move one of said cutters to sever and to transfer a strip portion, a presser opposed to said movable cutter, a pusher normally supported by said presser and to push said severed strip portion from between said cutter and presser into position for driving, and means to remove said pusher.

26. A machine of the class described comprising, in combination, strip carrying and reversing means, a driver, opposed cutters, means to move one of said cutters to sever and to transfer a strip portion, a presser opposed to said movable cutter, a pusher normally supported by said presser and to push said severed strip portion from between said cutter and presser into position for driving, and bevel faced coöperating pins and a driver actuated lever, to remove said pusher from the pathway of said driver.

27. A machine of the class described having, in combination, an oscillatory carrier arranged to support the end of a strip at one side of the axis of the carrier; inserting means; and fastener removing means arranged to separate a fastener from the strip at either side of the carrier axis.

28. A machine of the class described comprising, in combination, an oscillatory strip carrier, driving means and cutting means including a reciprocatory cutter made yielding in one direction of movement.

29. A machine of the class described having, in combination, an oscillable strip carrier; means to oscillate the carrier to reverse a strip; means to feed the strip fastener in-